US012333957B2

(12) United States Patent
Ushanov et al.

(10) Patent No.: US 12,333,957 B2
(45) Date of Patent: Jun. 17, 2025

(54) SYSTEMS AND METHODS FOR CONDUCTING A SYNCHRONIZED STUDENT-LECTURER SESSION IN E-LEARNING SERVER

(71) Applicants: Constructor Technology AG, Schaffhausen (CH); Constructor Education and Research Genossenschaft, Schaffhausen (CH)

(72) Inventors: Artem Ushanov, Astrakhan (RU); Ilia Iuskevich, Berlin (DE); Laurent Dedenis, Geneva (CH); Serg Bell, Singapore (SG); Stanislav Protasov, Singapore (SG)

(73) Assignees: Constructor Technology AG, Schaffhausen (CH); Constructor Education and Research Genossenschaft, Schaffhausen (CH)

( * ) Notice: Subject to any disclaimer, the term of this patent is extended or adjusted under 35 U.S.C. 154(b) by 0 days.

(21) Appl. No.: 18/360,112

(22) Filed: Jul. 27, 2023

(65) Prior Publication Data

US 2025/0037592 A1 Jan. 30, 2025

(51) Int. Cl.
*G09B 5/02* (2006.01)
(52) U.S. Cl.
CPC ..................... *G09B 5/02* (2013.01)
(58) Field of Classification Search
CPC .......... G09B 7/07; G09B 7/073; G09B 7/077; G09B 5/02
See application file for complete search history.

(56) References Cited

U.S. PATENT DOCUMENTS

| 6,471,521 | B1 * | 10/2002 | Dornbush | G09B 5/14 |
| | | | | 434/353 |
| 11,398,162 | B2 | 7/2022 | Delisle | |
| 2002/0192631 | A1 * | 12/2002 | Weir | G09B 7/07 |
| | | | | 434/350 |
| 2007/0218446 | A1 * | 9/2007 | Smith | G09B 5/00 |
| | | | | 434/350 |

(Continued)

FOREIGN PATENT DOCUMENTS

| CN | 110009951 A | 7/2019 |
| CN | 113506484 A | 10/2021 |

(Continued)

*Primary Examiner* — Peter R Egloff
(74) *Attorney, Agent, or Firm* — ESPE Legal Consultancy FZ-LLC

(57) ABSTRACT

Systems and methods for conducting a synchronized student-lecturer session on an e-learning server in a computer network. The method includes obtaining a lesson material template from the lecturer computing system; logging a lecturer and one or more students in the e-learning application by verifying respective credentials to access the lesson material template, presenting the lesson material template on a session screen of the e-learning application corresponding to the lecturer and the one or more student users; generating a lecturer session; generating a student session log; tracking the lecturer session log, wherein the lecturer activity as recorded in the lecturer session log is monitored by one or more student users, and tracking the student session log, wherein the student activity as recorded in the student session log is monitored by the lecturer user.

20 Claims, 3 Drawing Sheets

(56) References Cited

U.S. PATENT DOCUMENTS

| | | | |
|---|---|---|---|
| 2008/0162323 A1* | 7/2008 | Menear | G06Q 30/04 |
| | | | 705/1.1 |
| 2011/0065082 A1* | 3/2011 | Gal | G09B 7/02 |
| | | | 434/365 |
| 2013/0157242 A1* | 6/2013 | Leonardo | G09B 7/00 |
| | | | 434/322 |
| 2016/0088101 A1 | 3/2016 | Batiste et al. | |
| 2016/0148522 A1 | 5/2016 | Rowland et al. | |
| 2019/0088153 A1* | 3/2019 | Bader-Natal | H04N 7/147 |

FOREIGN PATENT DOCUMENTS

| | | |
|---|---|---|
| CN | 113784177 A | 12/2021 |
| KR | 102409044 B1 | 6/2022 |

\* cited by examiner

SYSTEMS AND METHODS FOR CONDUCTING A SYNCHRONIZED STUDENT-LECTURER SESSION IN E-LEARNING SERVER

TECHNICAL FIELD

The present disclosure generally relates to e-learning. In particular, the present disclosure relates to conducting a synchronized student-lecturer session in an e-learning server.

BACKGROUND

The education system has evolved to a great extent in the last few decades. However, the basis of the education system has remained same; in particular, a lecturer delivers a lecture and/or provides training material to a class of students, prepares a question paper based on the taught subject matter and students answer the questions, and, based on the answers provided by each question, the lecturer assesses the student and allots a grade. For lessons conducted on an e-learning platform, a lecturer creates study material, such as a presentation, documented notes, assignment documents and the like, that aids in completion of the lesson.

Merely reading out lecture notes or demonstrating a presentation can be a monotonous and ineffective way of conducting a lecture. Instead, when student participants work with background information, perform practical tasks related to the topic of the lesson, take frequent tests, and interact with the lecturer more as required, the students learn the topic quickly and more effectively.

When a lesson takes place in real time on an e-learning platform having several students attending the lecture at once, each student should be able to independently work with the course material. During the ongoing lecture, each student should be able to edit documents, run applications or code on their respective systems, in addition to watching a video or remote desktop where the ongoing lecture is being displayed. Managing many tasks simultaneously on the computing system leads to students juggling many tasks while trying to keep focus on the lecture. Each student needs to spend time downloading handouts or copying them, as well as completing assignments not in interactive mode, but in their own isolated space on the computing system. Moreover, as the students work on their respective computing systems, the teacher does not know about the status of the assignment by the student. Further, the student cannot control the display of educational materials during the lecture. For example, a student cannot go back to another slide in a presentation at a given instance as he wishes. Furthermore, another drawback is the inability of the lecturer to edit the course materials or documents during the lesson without having to roll back the changes later to conduct the same lesson with a different group of students.

Therefore, there is a need for synchronized student-lecturer sessions in an e-learning environment that allows the lecturers to edit course material during the lecture and monitor student activities. There is further a need to allow students to work on multiple screens and be able to have control over the content being displayed.

SUMMARY

The present disclosure relates to systems and methods for conducting a synchronized student-lecturer session on an e-learning server in a computer network. The computer network comprises at least one lecturer computing system and one or more student computing systems using an e-learning application deployed on the e-learning server.

In an embodiment, a method for conducting a synchronized student-lecturer session on an e-learning server in a computer network, wherein the computer network comprises at least one lecturer computing system and one or more student computing systems using an e-learning application comprises: obtaining a lesson material template from the lecturer computing system; logging a lecturer and one or more students in the e-learning application by verifying respective credentials to access the lesson material template, wherein access rights vary for the lecturer and the one or more students; presenting the lesson material template on a session screen of the e-learning application corresponding to the lecturer and the one or more student users; generating a lecturer session log including by: modifying the lesson material template during the student-lecturer session, and storing the modifications of the lesson material template along with a lecturer activity; generating a student session log including by: downloading a copy of the lesson material template on the student computing system; modifying the downloaded copy of the lesson material template in accordance with the access rights performed during the student-lecturer session, wherein the modification is performed on one or more task screens presented by the e-learning application on the student computing system, and wherein the student user can toggle between the session screen and the one or more task screens, and storing the modifications of the lesson material template along with a student activity; tracking the lecturer session log, wherein the lecturer activity as recorded in the lecturer session log is monitored by one or more student users, tracking the student session log, wherein the student activity as recorded in the student session log is monitored by the lecturer user; and synchronizing the lesson materials, wherein the student user has access to the lecturer activity and the lecturer user has access to student activity.

In one aspect, a method further includes storing the lecturer activity in the lecturer session log in a chronological sequence; and storing the student activity in the student session log in a chronological sequence.

In one aspect, a method further includes creating, if new lesson material is shared by the lecturer user during the student-lecturer session, a new lesson material template by updating the lesson material template with the new lesson material.

In one aspect, a method further includes storing the lecturer session log and the student session log as at least one of a recorded log and content directory, a container, or a virtual machine.

In one aspect, a method further includes obtaining, from the lecturer, the lesson material template created in an edit mode in the e-learning application.

In one aspect, a method further includes obtaining, from the lecturer, a recorded lesson material template uploaded to a service storage of the e-learning server.

In one aspect, a method further includes downloading the lesson material template at the beginning of a new session or before a scheduled lesson into a respective user account of the respective student computing system.

In one aspect, the lesson material template includes at least one of a media file, a script, a virtual machine, or source code.

In one aspect, the lesson material template is downloaded at an application memory dedicated to a corresponding user account or a local storage of the respective computing system.

In one aspect, a method further includes storing the lecturer session log and the student session log at an application memory dedicated to a corresponding user account or a local storage of the respective computing system.

In an embodiment, a system to conduct a synchronized student-lecturer session hosted on an e-learning server in a computer network, wherein the computer network comprises at least one lecturer computing system and one or more student computing systems comprises: a first e-learning application operably coupled to the lecturer computing system accessible to a lecturer user to create a lesson material template and conduct a lecture session; a second e-learning application accessible by a student user to view the lesson material template and participate in the lecture session; wherein the e-learning server comprises: a template module configured to obtain the lesson material template from the first e-learning application; a session manager configured to: log in a lecturer and one or more students in the e-learning application by verifying respective credentials to access the lesson material template, wherein access rights vary for the lecturer and the one or more students; present the lesson material template on a session screen of the first e-learning application and the second e-learning application; generate a lecturer session log including: modifying the lesson material template during the student-lecturer session, and storing the modifications of the lesson material template along with a lecturer activity; generating a student session log by: downloading a copy of the lesson material template on the student computing system, modifying the downloaded copy of the lesson material template in accordance with the access rights performed during the student-lecturer session, wherein the modification is performed on one or more task screens presented by the second e-learning application on the student computing system, and wherein the student user can toggle between the session screen and the one or more task screens, and storing the modification of the lesson material template along with student activities; a synchronizer configured to: track the lecturer session log, wherein the lecturer activity as recorded in the lecturer session log is monitored by one or more student users, track the student session log, wherein the student activity as recorded in the student session log is monitored by the lecturer user, and synchronize the lesson materials, wherein the student user has access to the lecturer activity and the lecturer user has access to student activity.

In an embodiment, a method for synchronizing two files comprises generating a first file, wherein the first file is associated with activity of a first user on a first computing system; generating a second file, wherein the second file is associated with activity of a second user on a second computing system, wherein the first computing system is different than the second computing system; detecting a change to the first file based on the activity of the first user; updating the second computing system based on the change to the first file; detecting a change to the second file based on the activity of the second user; and updating the first computing system based on the change to the second file.

The above summary is not intended to describe each illustrated embodiment or every implementation of the subject matter hereof. The figures and the detailed description that follow more particularly exemplify various embodiments.

BRIEF DESCRIPTION OF THE DRAWINGS

Subject matter hereof may be more completely understood in consideration of the following detailed description of various embodiments in connection with the accompanying figures, in which.

Figure 1:
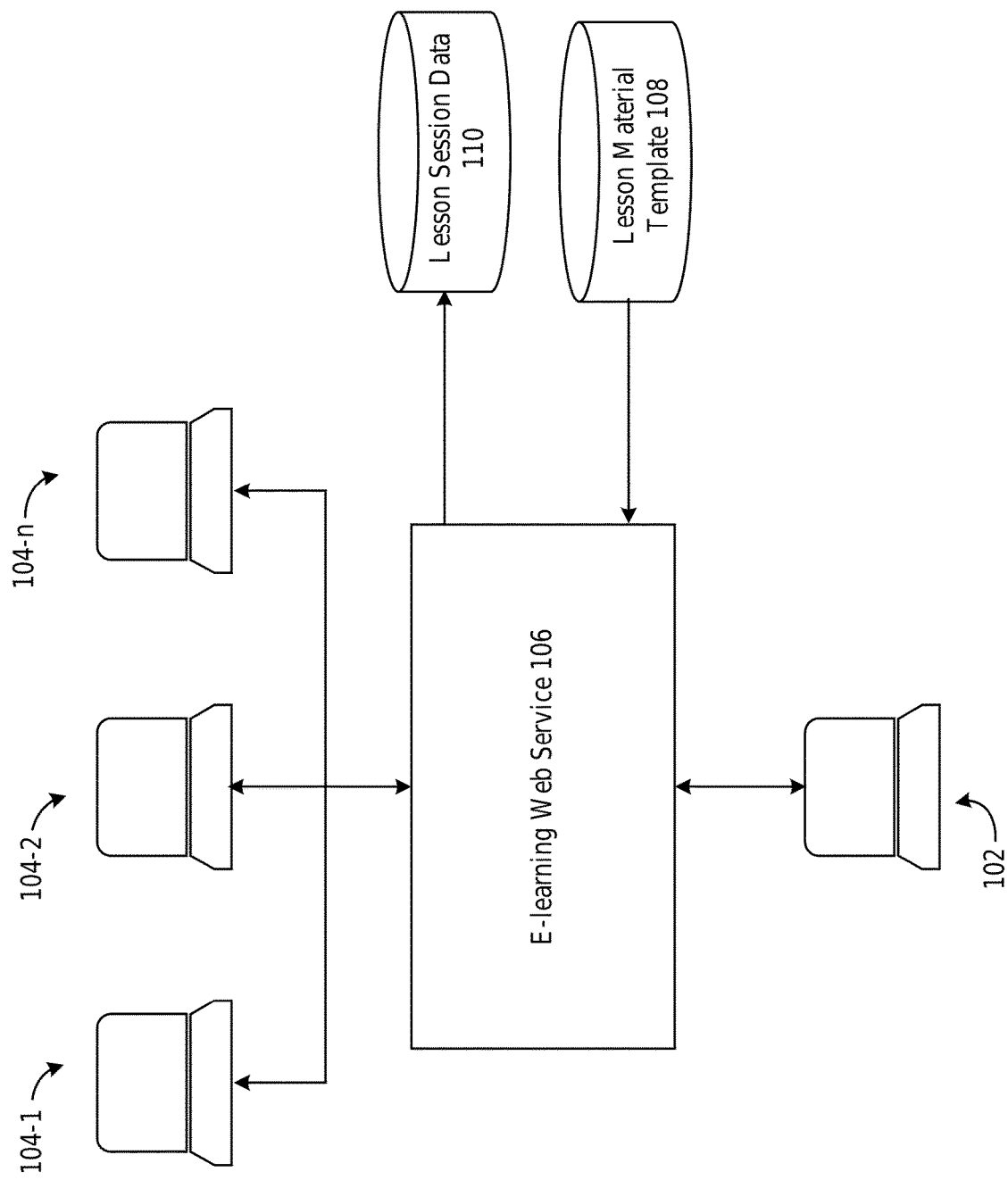
FIG. 1 is a block diagram of a system for conducting a synchronized student-lecturer session, in accordance with an embodiment.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

The present disclosure relates to systems and methods for conducting a synchronized student-lecturer session on an e-learning server in a computer network. Systems and methods particularly relate to synchronized student-lecture sessions in an e-learning server which allows the lecturers to edit course material during the lecture and monitor student activities and allow students to work on multiple screens and be able to have control over viewing the content being displayed.

FIG. 1 is a block diagram of a system environment for conducting a synchronized student-lecturer session, in accordance with an embodiment. In particular, a system, deployed in the system environment, is configured to conduct a synchronized student-lecture session on an e-learning server 202 in a computer network (as will be described further with respect to FIG. 2). E-learning is a learning session delivered over the internet or a corporate intranet to browser-equipped learners. The e-learning server 202 is configured by an e-learning web service 106. The e-learning web service 106 is a learning system based on formalized teaching but with the help of electronic resources known as e-learning. The electronic resources are implemented within a network. The provider of the e-learning web service 106 may provide one or more e-learning servers 202.

In an embodiment, the computer network comprises at least one lecturer computing system 102 and one or more student computing systems 104 with an e-learning application connected to the e-learning server 202. The e-learning application is implemented on a computing device operated by one or more users, such as students and lecturers. The user is an individual having access to one or more personal computing devices, such as a smartphone, laptop, or desktop computer. In an embodiment, the user may have to login, through each personal computing device, into the system using his security credentials.

The user, in one embodiment, is one or more students attending a lesson. In one aspect, a group of students attends multiple lessons conducted by the same lecturer or different lecturers by using the application. The system allows each user to use the respective registered credentials to login and access the system. The user can attend the lesson with varying rights, such as student's rights or the lecturer's rights.

In one embodiment, one or more computing devices are connected to the e-learning server through a network. The network can be a public network or a private network. The network can be a wired network or a wireless network. In one embodiment the network can be a cellular network.

In one embodiment, the e-learning server 202 (e.g. via the e-learning web service 106) is configured to access a lesson material template 108 and a lesson session data 110. As will be described further with respect to FIG. 2, the lesson session data 110 includes a lecturer session log 214 and a student session log 216. The lesson material template 108 is a course material that the lecturer prepared or downloaded for presenting during the lecture session. In one embodiment, the lesson material template 108 can be a document file, presentation file, recorded video, recorded screen, chat logs and such informative material in other computer readable formats. In one embodiment, the lecturer session log 214 includes data resulting from changes made by the lecturer in the lesson material template 108 during the lecture. Based on the changes, the lesson material template 108 will be newly created, or the changes will be discarded. In another embodiment, the student session log 216 includes changes made by students in the lesson material template 108. For example, the lesson material template 108 includes an assignment, and the work done on the assignment by the students is stored as a student session log 216. Other examples of the student session log 216 includes comments, or notes added by the student in the lesson material template 108, addition of illustrative figures for explanatory text, and and so on.

Figure 2:
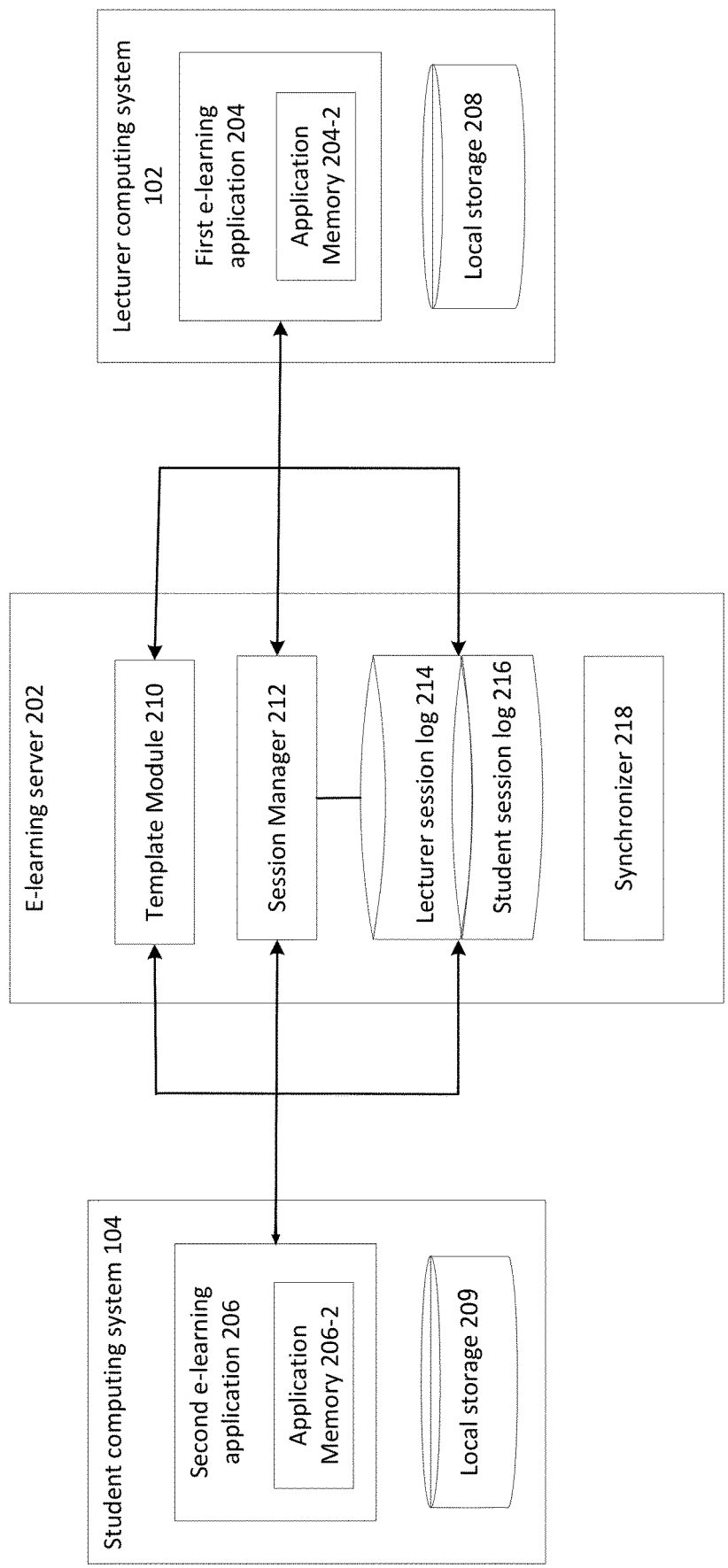
FIG. 2 is a block diagram of a system for conducting a synchronized student-lecturer session, in accordance with an embodiment.

FIG. 2 is a block diagram of a system for conducting a synchronized student-lecturer session, in accordance with an embodiment. In one embodiment, the system is configured to conduct a synchronized student-lecturer session on an e-learning application hosted on an e-learning server 202 in a computer network. The system comprises, but is not limited to, the e-learning server 202, at least one lecturer computing system 102, and a plurality of student computing systems 104-1, 104-2 . . . 104-n. The plurality of student computing systems 104-1, 104-2 . . . 104-n are collectively referred to as the student computing system 104. Each computing system has an e-learning application installed. For example, the lecturer computing system 102 is installed with a first e-learning application 204 and contains local storage 208, and the student computing system 104 is installed with a second e-learning application 206 and contains local storage 209. In the computer network, at least one lecturer computing system 102 and the plurality of student computing systems are connected to the e-learning application 204/206, and to the e-learning server 202 through the e-learning application 204/206.

In accordance with an embodiment, the system is configured to function through the first e-learning application 204, the second e-learning application 206, and the e-learning server 202. In one embodiment, the first e-learning application 204 is accessed by a lecturer to create a lesson material template 108 and conduct the lecture session. In one example, the first e-learning application 204 includes provisions and functions, such as enabling the lecturer to write down the lesson material template 108, to upload the lesson material template 108 in different formats, download the lesson material template 108 from any saved location and the like, editing tools to the lecturer, monitoring tools to monitor multiple screens of the students simultaneously, a toolbox with functions, such as color pens, highlighters, area selector, zoom-in zoom-out, and other such functions that can aid the lecturer in conducting the lecture session. The first e-learning application 204, in one embodiment, is configured to fetch data from the local storage 208 of the lecturer computing system, or other storage means, such as cloud or remote memory coupled to the lecturer computing system (not shown for ease of illustration). In one embodiment, the first learning application comprises an application memory 204-2 configured to store a copy of the lesson material template 108 downloaded by the lecturer and changes caused into the template by activities performed by the lecturer.

According to the embodiment, the second e-learning application 206 is installed at the student computing system 104 and is accessed by the student to use the lesson material template 108 and participate in the lecture session. For example, the second e-learning application 206 includes provisions and functions, such as enabling the student to download the lesson material template 108 and make changes in the lesson material template 108 and save a new updated copy, monitoring tools to monitor multiple screens and activities performed by the lecturer simultaneously, a toolbox with functions, such as color pens, highlighters, area selector, zoom-in zoom-out, and other such functions that can aid the student in attending the lecture session more interactively. The second e-learning application 206, in one embodiment, is configured to fetch data from the local storage 209 of the student computing system, or other storage means, such as cloud or remote memory coupled to the student computing system (not shown for ease of illustration). In one embodiment, the second learning application comprises an application memory 206-2 configured to store a copy of the lesson material template 108 downloaded by the student and changes caused into the template by activities performed by the student.

In some embodiments, the e-learning application 204/206 is configured as an application agent, a web page, or a plugin on the first computing system or the second computing system, or a web console opened in a web-browser.

In accordance with the embodiment, the e-learning server 202 is configured to perform an operation of conducting the e-learning synchronized student-lecturer session between connected lecturer computing system 102 and student computing system 104. In one embodiment, the e-learning server 202 comprises a template module 210, a session manager 212, and a synchronizer 218.

In one embodiment, the template module 210 is configured to obtain the lesson material template 108 from the first e-learning application 204. As described earlier, the lesson material template 108 can include a course material, study material, assessment material, informative material, or any such combination thereof. The lesson material template 108 can be prepared by the lecturer in a single format, and can include, for example presentations, recorded video, recorded screens, documents, and chat logs. The lecturer, then, can upload the training material in .doc or .txt format via first e-learning application 204. Likewise, the lecturer can upload a video file with an extension, such as .mkv, .mpg, .avi, .dat, and the like. In another example, the lecturer can create the lesson material template 108 with a combination of one or more formats, such as a presentation containing illustrative drawings. In one example, the lecturer can upload the lesson material template 108 on the template module 210. In another example, the lecturer can create the lesson material template 108 on the e-learning server 202. The lesson material template 108 is, thus, obtained by the template from the lecturer computing system 102 through the first e-learning application 204. In one embodiment, if the new lesson material is shared by the lecturer during the student-lecturer session, a new lesson material template 108 is created by updating the lesson material template 108 with the new lesson material.

In accordance with the embodiment, the session manager 212 is configured to manage the session data 110 created during the session and uploaded or downloaded before the lecture. In one embodiment, the session manager 212 is configured to log in a lecturer and one or more students in the respective e-learning application 204/206 by verifying respective credentials to access the lesson material template 108. The access rights allotted to the lecturer and the plurality of students varies. The session manager 212 is further configured to present the lesson material template 108 on a session screen of the e-learning application corresponding to the lecturer and the one or more student users. For example, if the lesson material template 108 contains a presentation, the presentation slides will be displayed through the e-learning application 204/206 on the computing system.

In one embodiment, the lesson material template 108 is downloaded at the beginning of a new session or before a scheduled lesson into the respective user account of the respective student computing system.

In accordance with an embodiment, the session manager 212 is further configured to generate the lecturer session log 214, which can include a change in the lesson material template 108 or other activities performed by the lecturer causing the change in data. The lecturer session log 214 is generated by modifying the lesson material template 108, based on the changes done by the lecturer in the lesson material template 108, during the student-lecturer session and storing the modifications of the lesson material template 108 along with a lecturer activity.

In accordance with an embodiment, the session manager 212 is further configured to generate the student session log 216 which can include a change in the lesson material template 108 or other activities performed by the student causing the change in data. The student session log 216 is generated by downloading a copy the lesson material template 108 on the student computing system, modifying the downloaded copy of the lesson material template 108 in accordance with the access rights performed during the student-lecturer session, and storing the modifications of the lesson material template 108 along with student activities. In one embodiment, the modification is performed on one or more task screens presented by the e-learning application 206 on the student computing system. For example, the student may wish to include notes or comments in his copy of the template, Accordingly, he may use the toolbox of the e-learning application 206 and select appropriate features from the toolbox to add the comment or notes in a desired section of the template on one screen, while still viewing the ongoing lecture session in real time on another screen. The student may wish to browse the internet for a while; he may open a search engine on yet another screen while the first two screens are still running. In another embodiment, the student user can toggle between the session screen and the one or more task screens. For example, the student can toggle between the browsing screen and the session screen as he desires.

In one embodiment, the lecturer session log 214 and the student session log 216 are stored at the e-learning application 204/206. The activities can be stored in a chronological sequence. For example, the lecturer session log 214 and the student session log 216 can be stored in a file data structure. In embodiments, logs 214/216 can be stored in a database. In embodiments, logs 214/216 can be stored in a linear data structure such as an array, a linked list, a stack, or a queue.

In another embodiment, the lecturer session log 214 and the student session log 216 are stored as a recorded log and content directory, a data container, and a virtual machine. Record logs enable a user to track and log any and all changes and deletes made to a record. Content directories offer a familiar, tree-like structure that provides convenient access to files on a content server without having to use that server's own user interface, such as web-based or otherwise. Content directories are essentially like the directories on a local computer, but they point to virtual locations on the content server. The data container is a container holding data for the application. A virtual machine (VM) is a digital version of a physical computer. Virtual machine software can run programs and operating systems, store data, connect to networks, and do other computing functions, and requires maintenance such as updates and system monitoring.

In yet another embodiment, the lecturer session log 214 and the student session log 216 are stored at an application memory dedicated to corresponding user accounts, such as a student account or a lecturer account, or a local storage 208/209 of the respective computing system.

In accordance with an embodiment, the synchronizer 218 of the e-learning server 202 is configured to track the activities performed by the students and the lecturer and synchronize the changes caused by the activities. In one embodiment, the synchronizer 218 is configured to track the lecturer session log 214 or portions of the lecturer session log 214. Activities performed by the lecturer are registered in the lecturer session log 214. The synchronizer 218 ensures the changes caused in session data 110 as a result of the activities are synchronized with the lesson material template 108 or a lecturer's copy of the template. In another embodiment, the lecturer activity as recorded in the lecturer session log 214 is monitored by one or more student users. For example, if the lecturer made some changes to a particular slide of the presentation, the student user can monitor the changes.

In accordance with an embodiment, the synchronizer 218 of the e-learning server 202 is further configured to track the student session log 216. Activities performed by the students are registered in the student session log 216 associated with the respective profile of the student. The synchronizer 218 ensures the changes caused in session data 110 as a result of the activities are synchronized with the lesson material template 108 or a student's copy of the template. Accordingly, the lecturer can monitor the activities performed by each student individually, such as assignment work done by the student, session login and logout time, and the like. In another embodiment, the lecturer can also monitor the screen status of each student, such as how many and which screens are operated by the student.

In an embodiment, the synchronizer 218 tracks the lecturer session log 214 in order to dynamically update data for the student user. For example, the synchronizer 218 can be communicatively coupled to the session manager 212 to update the student computing system 104. In an embodiment, the synchronizer 218 can update the application memory 206-2 or local storage 209 corresponding to changes in data tracked in the lecturer session log 214 via the session manager 212. Accordingly, the student user operating the second e-learning application 206 is provided dynamically-updated data from changes made by the lecturer user (e.g. in a lecture session).

In an embodiment, the synchronizer 218 tracks the student session log 216 in order to dynamically update data for the lecturer user. For example, the synchronizer 218 can be communicatively coupled to the session manager 212 to update the lecturer computing system 102. In an embodiment, the synchronizer 218 can update the application memory 203-2 or local storage 208 corresponding to changes in data tracked in the student session log 216 via the session manager 212. Accordingly, the lecturer user operating the first e-learning application 204 is provided dynamically-updated data from changes made by the student user (e.g. in a lecture session). In embodiments of multiple student users, the synchronizer 218 can similarly update the lecturer computer system 102 based on data tracked for all students (e.g. their respective student session log 216) in the lecture session.

In another embodiment, a shared data structure is utilized (though not depicted in FIG. 2). For example, data corresponding to activities performed by the lecturer are registered in the lecturer session log 214. Subsequently, the synchronizer 218 updates a data structure shared between the lecturer user and the student user to dynamically update portions of data that overlap between the two users to be used by both the first e-learning application 204 and the second e-learning application 206. Likewise, data corresponding to activities performed by the student are registered in the student session log 216. Subsequently, the synchronizer 218 updates the data structure shared between the lecturer user and the student user to dynamically update portions of data that overlap between the two users to be used by both the first e-learning application 204 and the second e-learning application 206.

In another embodiment, one or both of lecturer session log 214 and student session log 216 can be structured such that the synchronizer 218 can selectively synchronize based on the type of activity or type of data. In an embodiment, activities performed with media in media player, documents in document editor, presentation in presentation editor, source code in development tools are grouped and synchronized by these groups. For example, a session log can contain two groups of activities: presentation slideshow and source code editor. Depending on the context of the lesson, the presentation activities (switch slides, edit slides, start animations on slides or other actions) can be synchronized independently of the other group of activities (e.g. source code editor activities are not synchronized, or are synchronized at a later point in the session independent of the presentation activities). The data grouping and selective synchronization allows for efficient coordination of data such that portions of data but not all data in the respective session logs are transferred.

Figure 3:
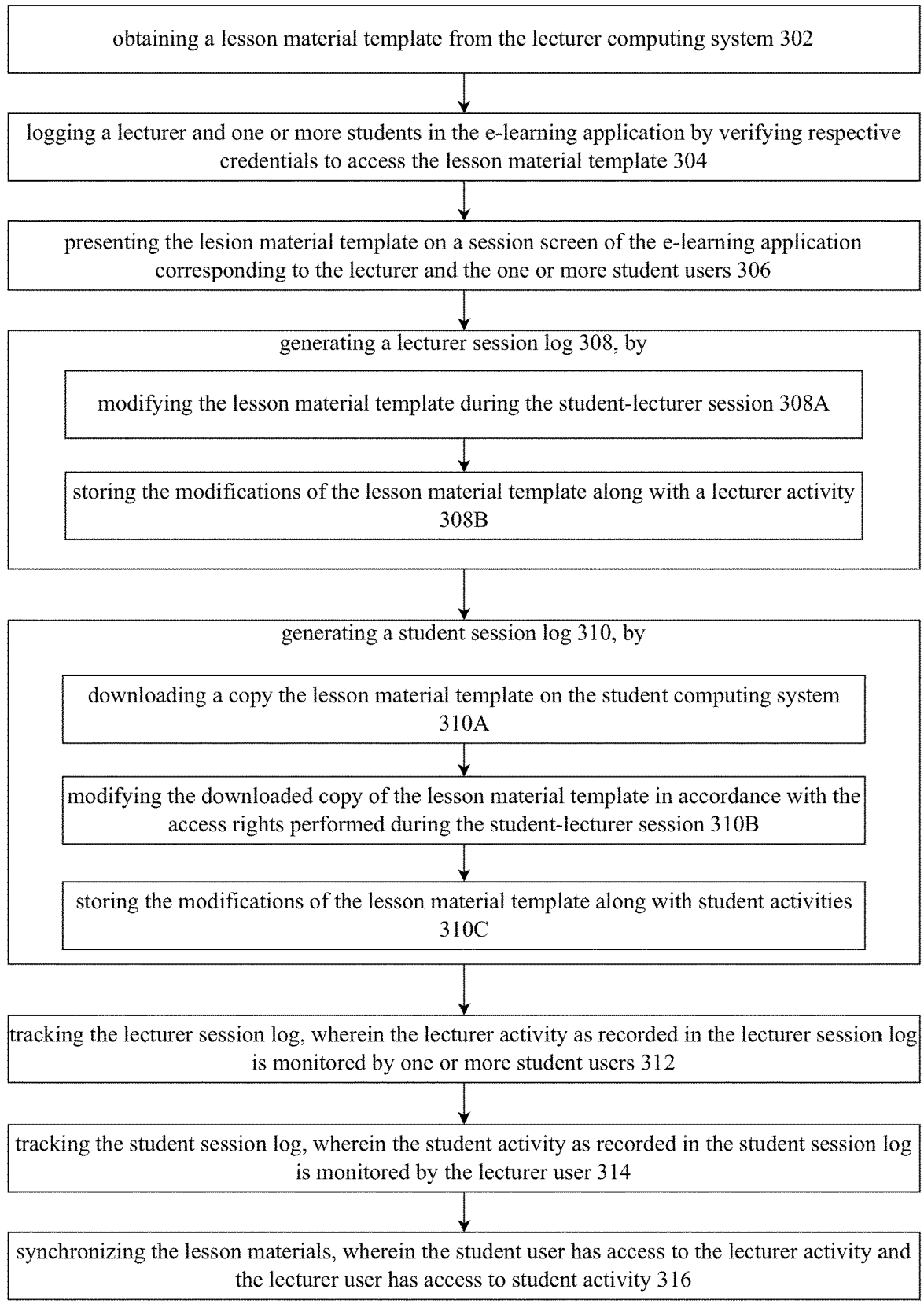
FIG. 3 is a flowchart of a method for conducting a synchronized student-lecturer session on an e-learning server in a computer network, in accordance with an embodiment.

FIG. 3 is a flowchart of a method 300 for conducting a synchronized student-lecturer session on an e-learning server 202 in a computer network, in accordance with an embodiment. The method 300 is implemented on the computer network comprising at least one lecturer computing system 102 and one or more student computing systems installed with an e-learning application deployed on the e-learning server 202.

According to an embodiment, at 302, a lesson material template 108 is obtained from the lecturer computing system 102. For example, the lesson material template 108 is created by the lecturer using the first e-learning application 204 or uploaded to the first e-learning application 204 from the lecture computing system 102.

According to an embodiment, at 304, the lecturer and one or more students log in to the respective e-learning application 204/206 by verifying respective credentials to access the lesson material template 108. Access rights assigned to e-learning applications 204/206 can vary for the lecturer and the one or more students.

According to an embodiment, at 306, the lesson material template 108 is presented on a session screen of the e-learning application corresponding to the lecturer and the one or more student users.

According to an embodiment, at 308, a lecturer session log 214 is generated. The lecturer session log 214 is generated by modifying, at 308A, the lesson material template 108 during the student-lecturer session, and storing, at 308B, the modifications of the lesson material template 108 along with a lecturer activity.

According to an embodiment, at 310, the student session log 216 is generated. The student session log 216 is generated by downloading, at 310A, a copy the lesson material template 108 on the student computing system 104, modifying, at 310B, the downloaded copy of the lesson material template 108 in accordance with the access rights performed during the student-lecturer session, and storing, at 310C, the modifications of the lesson material template 108 along with student activities. In one embodiment, the modification is performed on one or more task screens presented by the e-learning application 206 on the student computing system 104. In another embodiment, the student user can toggle between the session screen and the one or more task screens.

According to an embodiment of the method, at 312, the lecturer session log 214 is tracked. In one embodiment, the lecturer activity as recorded in the lecturer session log 214 is monitored by one or more student users.

According to an embodiment of the method, at 314, the student session log 216 is generated. In one embodiment, the student activity as recorded in the student session log 216 is monitored by the lecturer user.

In some embodiments, the method 300 includes storing the activities performed by the lecturer and one and more students in the lecturer session log 214 and the student session log 216, respectively, in a chronological sequence.

According to an embodiment of the method, at 316, the lesson materials are updated in a synchronized manner, wherein data is manipulated so that the student user has access to the lecturer activity and the lecturer user has access to student activity based on the tracking in 312 and 314.

In some embodiments, the method 300 includes creating anew lesson material template 108, if new lesson material is shared by the lecturer during the student-lecturer session, by updating the lesson material template 108 with the new lesson material.

In some embodiments, the method 300 includes storing the lecturer session log 214 and the student session log 216 as at least one of a recorded log and content directory, a container, or a virtual machine.

In some embodiments, the method 300 includes obtaining, from the lecturer, the lesson material template 108 created in an edit mode in the e-learning application 204.

In some embodiments, the method 300 includes obtaining, from the lecturer, a recorded lesson material template 108 uploaded to a service storage of the e-learning server 202.

In some embodiments, the method 300 includes downloading the lesson material template 108 at the beginning of a new session or before scheduled lesson into the respective user account of the respective student computing system.

In some embodiments, the method 300 includes downloading the lesson material template 108 at an application memory dedicated to a corresponding user account or a local storage 208/209 of the respective computing system.

In some embodiments, the method 300 includes installing the e-learning application 204/206 as an application agent, a web page, or a plugin on the first computing system and a second computing system.

In some embodiments, the method 300 includes storing the lecturer session log 214 and the student session log 216 at an application memory dedicated to a corresponding user account or a local storage 208/209 of the respective computing system.

The invention claimed is:

1. A method for conducting a synchronized student-lecturer session on an e-learning server in a computer network, wherein the computer network comprises at least one lecturer computing system and one or more student computing systems using an e-learning application, the method comprising:
obtaining a lesson material template from the lecturer computing system;
logging a lecturer and one or more students in the e-learning application by verifying respective credentials to access the lesson material template, wherein access rights vary for the lecturer and the one or more students;
presenting the lesson material template on a session screen of the e-learning application corresponding to the lecturer and the one or more student users;
generating a lecturer session log including by:
modifying the lesson material template during the student-lecturer session as at least one change to lecturer data, and
storing the modifications of the lesson material template along with a lecturer activity;
generating a student session log including by:
downloading a copy of the lesson material template on the student computing system;
modifying the downloaded copy of the lesson material template in accordance with the access rights performed during the student-lecturer session as at least one change to student data, wherein the modification is performed on one or more task screens presented by the e-learning application on the student computing system, the one or more task screens presenting at least one task related to the lesson material template for the student to perform on the student computing system while the lesson material template is being presented on the session screen, and wherein the student user can toggle between the session screen and the one or more task screens, and
storing the modifications of the lesson material template along with a student activity;
tracking the lecturer session log including determining the at least one change to lecturer data in the lecturer session log, wherein the lecturer activity as recorded in the lecturer session log is monitored by one or more student users, such that the at least one change to lecturer data is viewable on the one or more student computing systems,
tracking the student session log including determining the at least one change to student data in the student session log, wherein the student activity as recorded in the student session log is monitored by the lecturer user such that the at least one change to student data is viewable on the lecturer computing system; and synchronizing the lesson materials, wherein the student user has access to the lecturer activity by updating application memory of the e-learning application of the student computing system reflecting the at least one change to lecturer data and the lecturer user has access to student activity by updating application memory of the e-learning application of the lecturer computing system reflecting the at least one change to student data.

2. The method of claim 1, further comprising:
storing the lecturer activity in the lecturer session log in a chronological sequence; and
storing the student activity in the student session log in a chronological sequence.

3. The method of claim 1, further comprising creating, if new lesson material is shared by the lecturer user during the student-lecturer session, a new lesson material template by updating the lesson material template with the new lesson material.

4. The method of claim 1, further comprising storing the lecturer session log and the student session log as at least one of a recorded log and content directory, a container, or a virtual machine.

5. The method of claim 1, further comprising obtaining, from the lecturer, the lesson material template created in an edit mode in the e-learning application.

6. The method of claim 1, further comprising obtaining, from the lecturer, a recorded lesson material template uploaded to a service storage of the e-learning server.

7. The method of claim 1, further comprising downloading the lesson material template at the beginning of a new session or before a scheduled lesson into a respective user account of the respective student computing system.

8. The method of claim 7, wherein the lesson material template includes at least one of a media file, a script, a virtual machine, or source code.

9. The method of claim 7, wherein the lesson material template is downloaded at an application memory dedicated to a corresponding user account or a local storage of the respective computing system.

10. The method of claim 1, further comprising storing the lecturer session log and the student session log at an application memory dedicated to a corresponding user account or a local storage of the respective computing system.

11. A system to conduct a synchronized student-lecturer session hosted on an e-learning server in a computer network, wherein the computer network comprises at least one lecturer computing system and one or more student computing systems, the system comprising:
a first e-learning application operably coupled to the lecturer computing system accessible to a lecturer user to create a lesson material template and conduct a lecture session;
a second e-learning application accessible by a student user to view the lesson material template and participate in the lecture session;
wherein the e-learning server comprises:
a template module configured to obtain the lesson material template from the first e-learning application;
a session manager configured to:
log in a lecturer and one or more students in the e-learning application by verifying respective credentials to access the lesson material template, wherein access rights vary for the lecturer and the one or more students;

present the lesson material template on a session screen of the first e-learning application and the second e-learning application;
generate a lecturer session log including:
modifying the lesson material template during the student-lecturer session as at least one change to lecturer data, and
storing the modifications of the lesson material template along with a lecturer activity;
generating a student session log by:
downloading a copy of the lesson material template on the student computing system,
modifying the downloaded copy of the lesson material template in accordance with the access rights performed during the student-lecturer session as at least one change to student data, wherein the modification is performed on one or more task screens presented by the second e-learning application on the student computing system, the one or more task screens presenting at least one task related to the lesson material template for the student to perform on the student computing system while the lesson material template is being presented on the session screen, and wherein the student user can toggle between the session screen and the one or more task screens, and
storing the modification of the lesson material template along with student activities;
a synchronizer configured to:
track the lecturer session log including determining the at least one change to lecturer data in the lecturer session log, wherein the lecturer activity as recorded in the lecturer session log is monitored by one or more student users, such that the at least one change to lecturer data is viewable on the one or more student computing systems,
track the student session log including determining the at least one change to student data in the student session log, wherein the student activity as recorded in the student session log is monitored by the lecturer user such that the at least one change to student data is viewable on the lecturer computing system, and
synchronize the lesson materials, wherein the student user has access to the lecturer activity by updating application memory of the e-learning application of the student computing system reflecting the at least one change to lecturer data and the lecturer user has access to student activity by updating application memory of the e-learning application of the lecturer computing system reflecting the at least one change to student data.

12. The system of claim 11, wherein the session manager is further configured to store the lecturer activity in the lecturer session log in a chronological sequence; and store the student activity in the student session log in a chronological sequence.

13. The system of claim 11, wherein if new lesson material is shared by the lecturer user during the student-lecturer session, a new lesson material template is created by updating the lesson material template with the new lesson material.

14. The system of claim 11, wherein the lecturer session log and the student session log are stored as at least one of a recorded log and content directory, a container, or a virtual machine.

15. The system of claim 11, wherein the template module is configured to obtain, from the lecturer user, the lesson material template created in an edit mode in the first e-learning application.

16. The system of claim 11, wherein the template module is configured to obtain, from the lecturer user, a recorded lesson material template uploaded to the template module.

17. The system of claim 11, wherein the session manager is further configured to download the lesson material template at the beginning of a new session or before a scheduled lesson, through the second e-learning application into a respective user account.

18. The system of claim 17, wherein the lesson material template is downloaded at an application memory dedicated to a corresponding user account or a local storage of the respective computing system.

19. The system of claim 17, wherein the lecturer session log and the student session log are stored at an application memory dedicated to a corresponding user account or a local storage of the respective computing system.

20. The system of claim 11, wherein the lecturer session log is a shared data structure between the lecturer user and the student user.

* * * * *